United States Patent
Bolian et al.

(10) Patent No.: US 6,931,458 B2
(45) Date of Patent: Aug. 16, 2005

(54) APPARATUS AND METHOD FOR REFRESHING A TERMINAL DISPLAY IN A MULTIPLE INFORMATION HANDLING SYSTEM ENVIRONMENT

(75) Inventors: Albert J. Bolian, Round Rock, TX (US); Scott Ramsey, Austin, TX (US); Jinsaku Masuyama, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 310 days.

(21) Appl. No.: 10/406,114

(22) Filed: Apr. 3, 2003

(65) Prior Publication Data

US 2004/0199698 A1 Oct. 7, 2004

(51) Int. Cl.[7] .............................. G06F 3/00; G06F 15/16
(52) U.S. Cl. ............................................ 710/15; 709/219
(58) Field of Search .............................. 710/15, 17, 18, 710/62, 305, 316; 709/217–219, 223, 224

(56) References Cited

U.S. PATENT DOCUMENTS

| | | | | |
|---|---|---|---|---|
| 6,170,021 B1 | * | 1/2001 | Graf | 710/15 |
| 6,321,287 B1 | * | 11/2001 | Rao et al. | 710/260 |
| 6,408,334 B1 | * | 6/2002 | Bassman et al. | 709/223 |
| 6,735,660 B1 | * | 5/2004 | Osten et al. | 710/305 |

OTHER PUBLICATIONS

Microsoft Corporation, *Serial Port Console Redirection Table*, Jan. 11, 2002.
Super Micro Computer, Inc., IPMI View User Guide, 2002.
Caler, Gary and Quingsong Li; *Dell Power Edge 350 Console Redirection and Pre–boot Execution Environment (PXE) Support*; Feb. 2002.
Nguyen, Dung, *Dell Remote Access Card (DRAC) III Console Redirection*, Mar. 2002.

\* cited by examiner

Primary Examiner—Khanh Dang
(74) Attorney, Agent, or Firm—Haynes and Boone, LLP

(57) ABSTRACT

A blade server system includes multiple blade servers at a common location coupled to a concentrator. The concentrator connects the blade servers to a remote terminal. Upon command from the remote terminal, the concentrator connects a particular one of the blade servers to the remote terminal. Each blade server senses when it is newly connected to the remote terminal and upon detection of such a new connection, a complete screen refresh is sent by the newly connected blade server to the remote terminal. In this manner, contamination of the display of the remote terminal by leftover text from a prior connected blade server is advantageously avoided.

20 Claims, 6 Drawing Sheets

US 6,931,458 B2

APPARATUS AND METHOD FOR REFRESHING A TERMINAL DISPLAY IN A MULTIPLE INFORMATION HANDLING SYSTEM ENVIRONMENT

BACKGROUND

The disclosures herein relate generally to information handling systems and more particularly to multiple information handling systems coupled to a common remote terminal.

As the value and use of information continue to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In the enterprise environment as well as other environments, multiple information handling systems are frequently connected to a common remote terminal or console, such as a VT100 or ANSI "dumb terminal". In the modern computer server environment, it is typical for multiple servers such as so-called "blade servers" or simply "blades" to be housed in a common rack. Generally, each blade server in the rack is not equipped with its own unique keyboard, mouse and display. Rather, the blade servers are typically connected via their serial ports to a concentrator switch which is coupled to a common remote terminal. The concentrator switch allows the multiple blade servers to share the same remote terminal. Upon command from the remote terminal, the concentrator switch will switch from blade server to blade server, thus enabling the remote terminal to send information to, and receive information from, any particular blade server that a remote terminal administrator desires.

Unfortunately in the above described arrangement, a problem arises when a remote administrator switches between the blades from his or her remote terminal console. Typically, text updates are sent to the remote terminal's display screen when screen attributes change. In other words, the whole screen contents are not updated when the concentrator switch changes from one blade to another blade. Rather, just a portion of the text on the screen is changed, namely the portion corresponding to the newly connected blade's current update. Thus, when switching from blade to blade, the remote terminal's display screen becomes quickly garbled. This occurs because some contents from the prior connected blade undesirably remain on the screen after the remote terminal has switched from that blade to another blade.

Therefore, what is needed is blade server system which enables the remote terminal to switch from blade to blade without the terminal's display screen being contaminated by text remaining from a prior connected blade.

SUMMARY

Accordingly, in one embodiment, a system is provided which includes a plurality of information handling systems situated in a common location. A concentrator is coupled to the plurality of information handling systems by a respective I/O bus between each information handling system and the concentrator and by a respective sideband channel between each information handling system and the concentrator. A remote terminal including a display is coupled to the concentrator to enable the remote terminal to send information to and receive information from the plurality of information handling systems. The concentrator reports to a particular information handling system that the remote terminal has instructed the concentrator to connect the remote terminal to the particular information handling system, and in response, the particular information handling system sends a display refresh to the concentrator for transmission to the remote terminal. The display refresh flushes or overwrites text on the display of the remote terminal that would otherwise remain from an information handling system which was previously connected by the concentrator to the remote terminal.

A principal advantage of the embodiment disclosed herein is that the display of the remote terminal does not become contaminated with text remaining from a prior connected information handling system when the remote terminal instructs switching from one information handling system to another.

DETAILED DESCRIPTION

Figure 1:
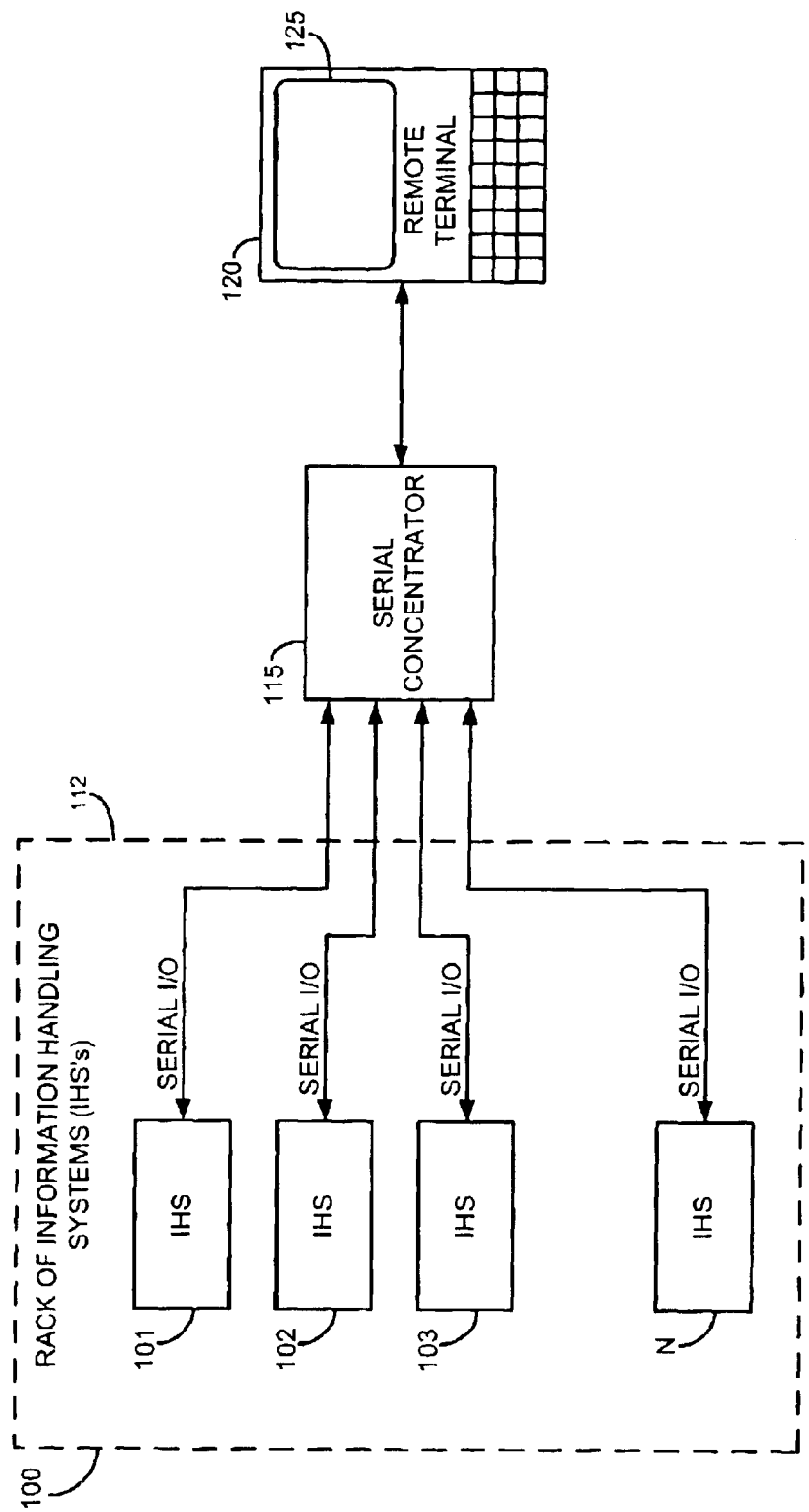
FIG. 1 is a block diagram illustrating a conventional serial concentrator arrangement for connecting a remote terminal to a plurality of blade servers.

FIG. 1 is a block diagram of a blade server system 100 which illustrates in more detail the problem to be solved. System 100 includes information handling systems (IHS's) 101, 102, 103 . . . N wherein N is the total number of information handling systems in a particular rack 112. The IHS's in rack 112 of system 100 are blade servers, each of which includes a serial input output (I/O) port that is coupled via serial concentrator 115 to a remote terminal 120. Serial concentrator 115 couples one IHS at a time to remote terminal 120. Serial concentrator 115 is typically a switch which includes buffer memory. Remote terminal 120 commands serial concentrator 115 to connect remote terminal 120 to any one of IHS's 101, 102, 103 . . . N. In this manner, all of the IHS's of system 100 can share a single remote terminal 120, albeit one IHS at a time.

Remote terminal 120 is a so-called "dumb terminal" such as a VT100 or ANSI terminal or console. Such a terminal typically includes a display 125 which displays received serial information as text in fixed rows and columns. Assuming that serial concentrator 115 is presently connecting IHS 101 to remote terminal 120, display 125 displays serial text information received from IHS 101. Once IHS 101 has been initialized and populates display 125 with information, IHS 101 only sends update information to remote terminal 120. In other words, if 2 characters change in IHS 101, IHS 101 will send an update to remote terminal 120 including only those two characters. Unfortunately, a problem arises when remote terminal 120 commands serial concentrator 115 to switch from one IHS, such as IHS 101, to another IHS, such as IHS 102. Before switching, display 125 of remote terminal 120 is populated with serial text information from IHS 101. Assuming that remote terminal 120 now commands serial concentrator 115 to connect IHS 102 to remote terminal 120, IHS 102 will only send update information to remote terminal 110. Thus, after such switching, updated text information from IHS 102 will appear on the remote terminal's display along with text information from prior connected IHS 101. New text from IHS 102 is undesirably mixed with old text from IHS 101. This can make the text on the display of remote terminal 120 unintelligible or garbled.

Figure 2:
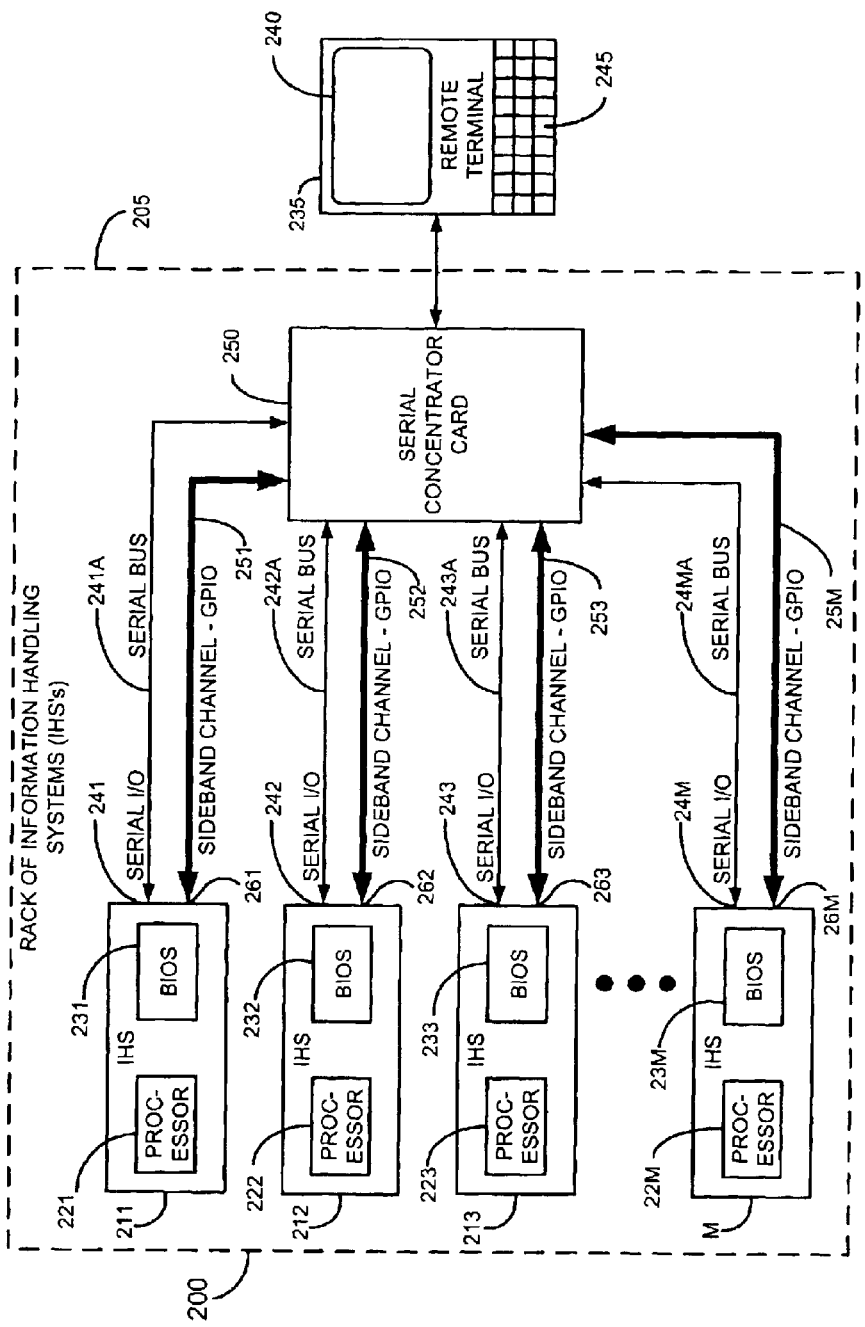
FIG. 2 is a block diagram illustrating an embodiment of the disclosed system for connecting a remote terminal to a plurality of blade servers.

An apparatus for solving this problem is depicted in FIG. 2 which shows a server system 200 formed by a rack 205 of information handling systems (IHS's) 211, 212, 213 . . . M wherein M is the total number of IHS's in the rack. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

IHS's 211, 212, 213 . . . M include respective processors 221, 222, 223 . . . 22M and respective Basic Input Output System (BIOS) firmware 231, 232, 233 . . . 23M. IHS's 211, 212, 213 . . . M also include respective serial ports 241, 242, 243 and 24M. Serial ports 241, 242, 243 and 24M are coupled to a serial concentrator 250 situated within rack 205. Serial concentrator 250 is coupled to a remote terminal 235 which includes a display 240 and a keyboard 245. Serial concentrator 250 is a switch which can selectively connect any of the IHS's to remote terminal 235 upon command from remote terminal 235. Remote terminal 235 can be implemented as a VT-100 or ANSI "dumb terminal" or a computer system emulating such a terminal. Remote terminal 235 instructs serial concentrator 250 to connect remote terminal 235 to any one of IHS's 211, 212, 213 . . . M. A user at terminal 235 actually initiates this switching action of serial concentrator 250 by instructing remote terminal 235 to issue a command to concentrator 250 telling it to switch to the desired IHS. Each IHS 211, 212, 213 . . . M is also coupled to serial concentrator 250 by a respective sideband channel 251, 252, 253 . . . 25M that is coupled to sideband channel I/O ports 261, 262, 263 . . . 26M, respectively. A sideband channel is a channel that remains operative independent of the processor of an information handling system. One type of sideband channel which may be employed as the above sideband channels is a General Purpose I/O (GPIO) standard bus. In one embodiment, each of IHS's 211, 212, 213 . . . M includes firmware code stored in BIOS which monitors the GPIO bus to determine when concentrator 250 has been switched to connect the particular IHS to remote terminal 235. The "context" of concentrator 250 is defined to be a status indicator or status flag on the sideband channels indicating whether a particular IHS is connected or unconnected to remote terminal 235 via concentrator 250. More specifically, each IHS monitors its respective sideband channel to determine when its status goes from being unconnected to remote terminal 235 to being connected to the remote terminal 235.

For example, it is assumed that IHS 211 is currently connected to remote terminal 235 via the switching action of serial concentrator 250. When IHS 211 generates output information which is to be displayed by remote terminal 235, IHS 211 sends an update via serial I/O port 241 which changes the appropriate portion of the text on display 235. Assuming that a user at remote terminal 235 desires to now connect terminal 235 to IHS 212, a command is sent by terminal 235 to serial concentrator 250 instructing concentrator 250 to connect terminal 235 to IHS 212. Like the other IHS's, IHS 212 is monitoring its sideband channel to determine if the context of concentrator 250 has been changed. More particularly, IHS 212 monitors sideband channel 252 to determine if a respective status indicator or status flag in concentrator 250 signals that the context of concentrator 250 has changed to indicate a connection between remote terminal 235 and IHS 212. If IHS 212 determines that the context has so changed, indicating a new connection between terminal 235 and IHS 212, then IHS 212 sends a complete screen refresh over serial I/O bus 242A to display 240 of terminal 235. Because an entire screen of information is sent from IHS 212 to terminal 235, display 240 will display the information from IHS 212 without being corrupted by leftover information from the prior connected IHS 211. Old text on display 240 is thus effectively flushed or overwritten. Likewise, the remaining IHS's monitor their respective sideband channels for a change of context indicating when each IHS becomes connected to terminal 235. When a particular IHS detects its new connection to terminal 235, then that particular IHS will send a whole screen of data, i.e. a complete screen refresh, to terminal 235. Again, contamination of display 240 with information from prior connected IHS's is desirably avoided.

Each of IHS's 211, 212, 213 . . . M includes Basic Input/Output System (BIOS) is firmware 231, 232, 233 . . . 23M which monitors concentrator 250 via respective sideband channels 251, 252, 253 . . . 25M to determine when remote terminal 235 is connected to a particular IHS. When such a connection is made to a particular IHS, the status of the associated sideband channel goes from an inactive state to an active state. The particular IHS and its BIOS effectively see this status change and, in response, send a complete screen refresh to display 240 of terminal 235. The particular IHS thus connected is now able to send information through concentrator 250 to terminal 235. Connecting an IHS to terminal 235 in this manner is referred to as "console redirection" because the console of a particular IHS, i.e. the display and keyboard associated therewith, is effectively directed across a switched serial connection to a remote terminal.

It is noted that remote terminal 235 is remote with respect to server system 200 in the sense that it is some distance from server system 200. However this distance could be very small. Remote terminal 235 could be in a distant city with respect to server system 200. Alternatively, remote terminal 235 could be in the same room or building as server system 200.

Figure 3:
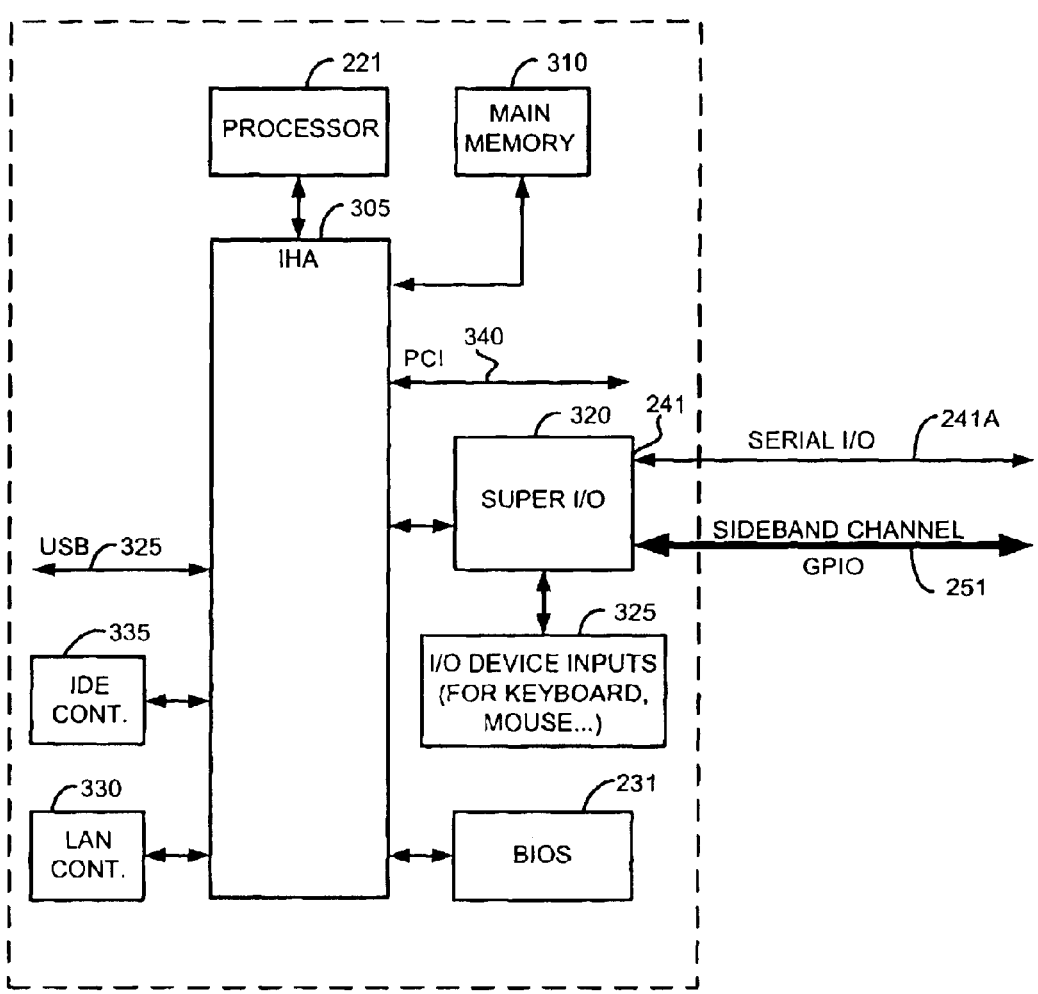
FIG. 3 is a block diagram illustrating an embodiment of one information handling system which may be employed in the system of FIG. 2.

FIG. 3 is a block diagram of one IHS 211 that may be employed as IHS's 211, 212, 213 . . . M. IHS 211 includes a processor 221 such as an Intel Pentium series processor or one of many other processors currently available. An Intel Hub Architecture (IHA) chipset 305 provides IHS 211 with graphics/memory controller hub functions and I/O functions. Chipset 305 acts as a controller for main memory 310 which is coupled thereto. IHA chipset 305 also acts as an I/O controller hub (ICH) which performs I/O functions. A super input/output (I/O) controller 320 is coupled to chipset 305 to provide communications between chipset 305 and input devices 325 such as a mouse, keyboard, and tablet, for example. Super I/O controller 320 includes a serial port 241 which is coupled to serial concentrator 250 as shown in FIG. 2. Returning to FIG. 3, a universal serial bus (USB) 325 is coupled to chipset 305. System basic input-output system (BIOS) 231 is coupled to chipset 305 as shown. A local area network (LAN) controller 330, alternatively called a network interface controller (NIC), is coupled to chipset 305. Integrated drive electronics (IDE) controller 335 is coupled to chipset 305 so that devices such as media drives can be connected to chipset 305 and processor 221. Devices that can be thus coupled via IDE controller 335 include hard disk drives, CD-ROMs drives, DVD drives, and other fixed or removable media drives. An expansion bus 340, such as a Peripheral Component Interconnect (PCI) bus, is coupled to chipset 305 as shown. Expansion bus 340 includes one or more expansion slots (not shown) for receiving expansion cards which provide IHS 211 with additional functionality.

System BIOS 231 includes firmware that controls the interfacing of IHS 211 to devices external to IHS 211. BIOS 231 includes a console redirection handler routine which redirects keyboard and mouse inputs and display information to serial port 241. These inputs and display information are communicated through serial concentrator 250 to remote terminal 235 when concentrator 250 is switched to connect IHS 211 to remote terminal 235. In this manner, remote terminal 235 is able to send keyboard and other input information to IHS 211 or the other IHS's when coupled thereto by concentrator 250. When IHS 211 is connected to remote terminal 235, IHS 211 also sends display information to terminal 235 via serial port 241 and serial bus 241A. The display information thus sent includes text which is displayed on display 240 of terminal 235. This display information can be combined with other information on display 240.

Figure 4:
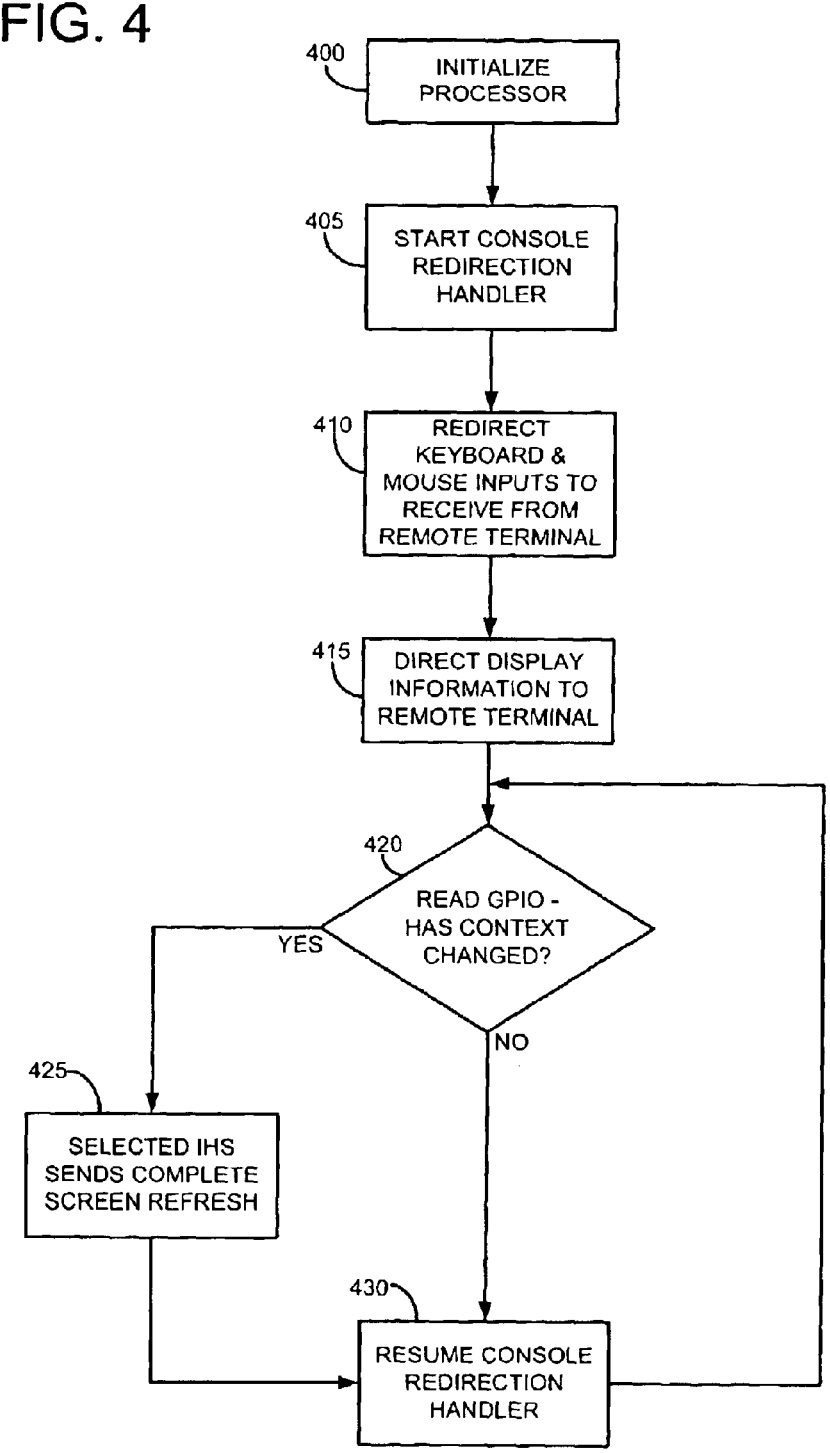
FIG. 4 is a flow chart depicting process flow in the system of FIG. 2.

FIG. 4 is a flow chart which shows the process flow of the console redirection handler routine of BIOS 231. Processor 221 of representative IHS 211 is initialized as per block 400. The console redirection handler routine of BIOS 231 is then started or run as per block 405. In each IHS, such as IHS 211 for example, the keyboard and mouse inputs are redirected to serial concentrator 250 and remote terminal 235 as per block 410. Thus when a particular IHS is connected to remote terminal 235 by concentrator 250, a user at remote terminal 235 can send keyboard and mouse input signals to the particular IHS. The particular IHS sends display information, for example serial data, via serial concentrator 250 to remote terminal 235, as per block 415.

Each of IHS's 211, 212, 213 . . . M monitor and read their respective sideband channels to determine if the context of concentrator 250 has changed. More particularly, each IHS conducts a test at decision block 420 to determine if the status of the sideband channel it monitors has changed from inactive (meaning that concentrator 250 is not connecting remote terminal 235 to that IHS) to active (meaning that concentrator 250 is now connecting remote terminal 235 to that particular IHS). The term context is used to describe whether or not a particular IHS is currently connected or not connected to remote terminal 235. If the context has changed and a particular IHS senses this change at block 420, the IHS coupled to the now active sideband channel sends a complete screen refresh over a respective serial bus to concentrator 250 and remote terminal 235 as per block 425. Because the full screen or substantially the full screen of display 240 of terminal 235 is refreshed, there is no undesired display data remaining from the IHS that was previously connected to the remote terminal. Alternatively, if decision block 420 determines in the BIOS of a particular IHS that the context has not changed, i.e. it's respective sideband channel is still inactive, then as per block 430 process flow is directed back to decision block 420 where the BIOS of the particular IHS continues to monitor for a change of context on its sideband channel from inactive to active.

Figure 5:
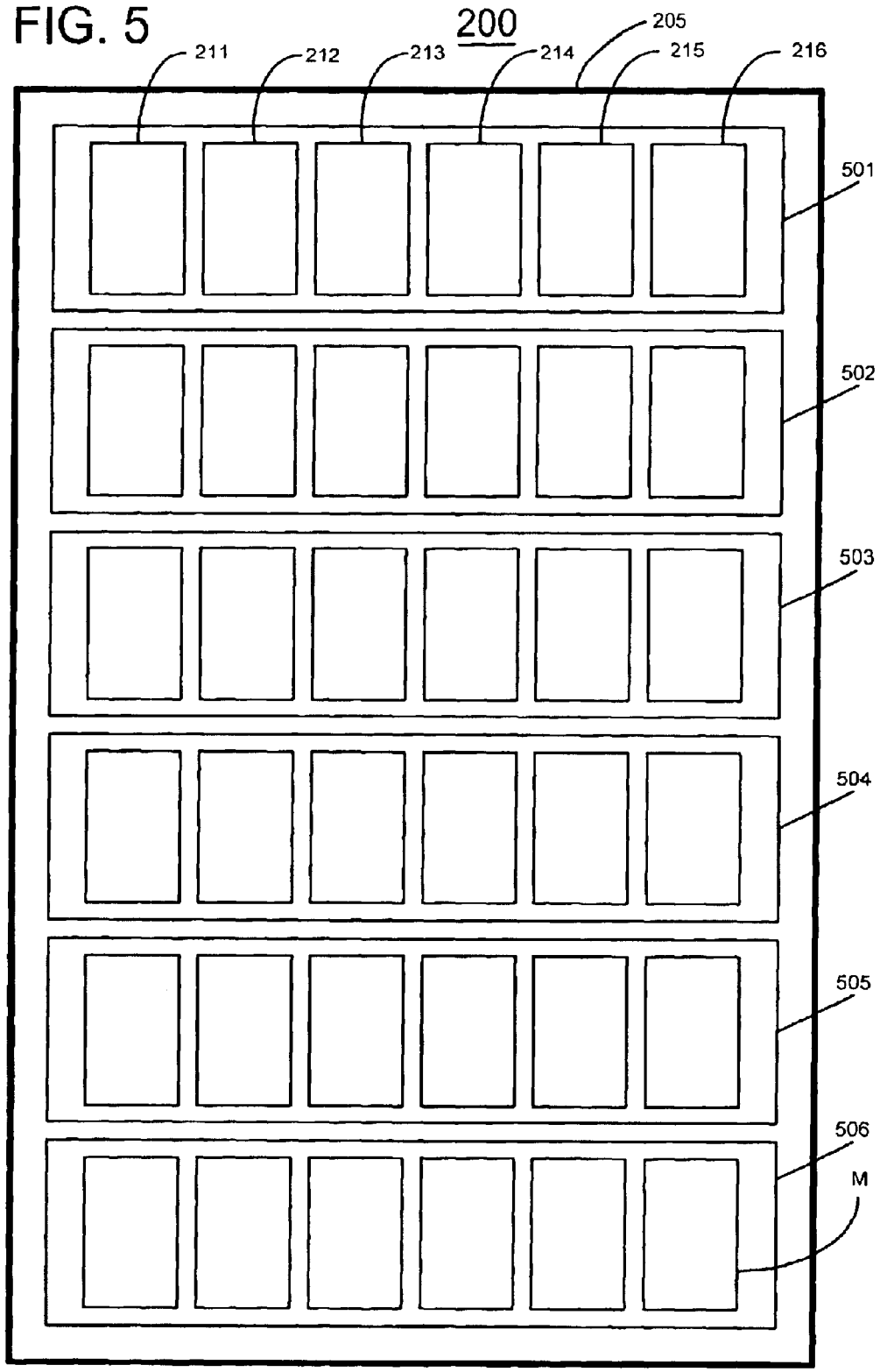
FIG. 5 is a front plan view of the system of FIG. 2.

FIG. 5 is a front plan view of rack 205 showing IHS's 211, 212, 213 . . . M mounted therein to form server system 200. The particular IHS's shown in this embodiment are blade servers. IHS's 211, 212, 213, 214, 215 and 216 are mounted in a chassis 501 which is the uppermost chassis in server system 200. Another six blade servers are mounted below chassis 501 in each of chassis 502, 503, 504, 505 and 506 of server system 200 as shown. Thus, the total capacity of this particular system is 36 IHS's or blade servers. A larger or small number of IHS's can be employed in a particular system according to the user's needs.

Figure 6:
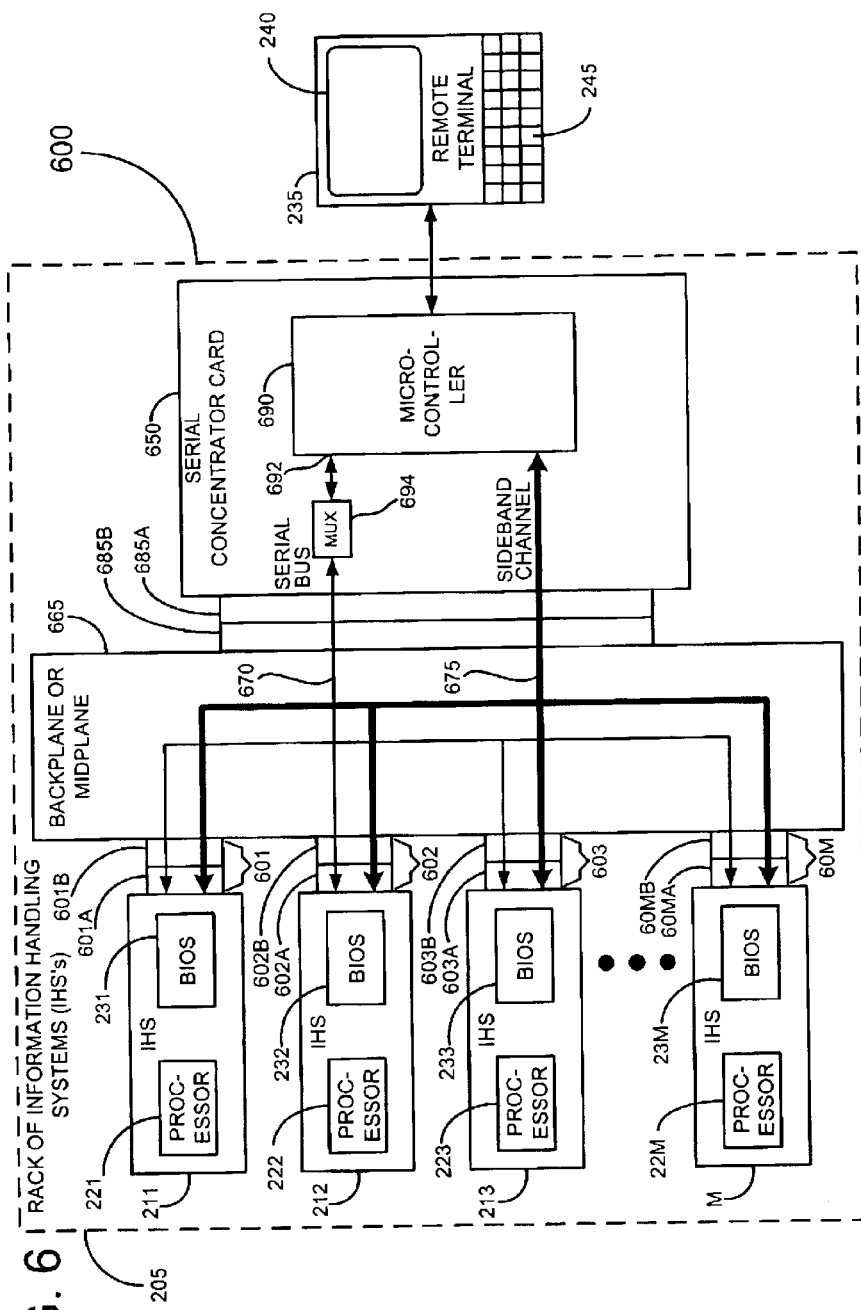
FIG. 6 is a more detailed implementation illustrating an embodiment of the disclosed system.

FIG. 6 shows a more detailed representation of the disclosed server system as system 600 which includes electrical/mechanical interconnects. System 600 of FIG. 6 is similar to system 200 of FIG. 2 with like numerals indicating like components. System 600 includes a rack 205 of information handling systems (IHS's) 211, 212, 213 . . . M wherein M is the total number of IHS's in the rack as defined earlier. System 600 includes a backplane or midplane circuit board 665 which facilitates the connection of serial bus 670 and sideband channel 675 between serial concentrator 650 and IHS's 211, 212, 213 . . . M. Although serial bus 670 is drawn as a single line as it enters serial concentrator 650, serial bus 670 includes the serial signals from each of and IHS's 211, 212, 213 . . . M. In other words, serial bus 670 actually includes multiple serial buses which are connected to serial concentrator 650. Although the sideband channels between each IHS and serial concentrator 650 are drawn together as a single line 675 entering serial concentrator 650, sideband channel 675 includes the sideband channels associated with each of IHS's 211, 212, 213 . . . M.

To actually connect IHS's 211, 212, 213 . . . M to backplane 665, connectors 601A, 602A, 603A . . . 60MA on IHS's 211, 212, 213 . . . M are plugged into respective mating connectors 601B, 602B, 603B . . . 60MB of backplane 665 as shown. Serial concentrator 650 includes a connector 685A which plugs into a connector 685B on backplane 665 to connect serial concentrator 650 to backplane 665. Serial concentrator 650 includes a microcontroller 690 having a serial interface 692 which is coupled via a multiplex switch (MUX) 694 to serial bus 670. When remote terminal 235 sends a command to server system 600 requesting connection to one of its IHS's, the command is first received by microcontroller 690 in serial concentrator 650. In response, microcontroller 690 instructs MUX switch 694 to connect remote terminal 235 to the particular one of IHS's 211, 212, 213 . . . M designated by the remote terminal's command. All of IHS's 211, 212, 213 . . . M are monitoring their respective sideband channels to determine if their status has gone from being inactive to being actively connected to the remote terminal. The particular IHS who is now newly active sends a complete screen refresh to remote terminal 235. In this manner, contamination of the screen display with information from a prior connected IHS is advantageously avoided.

Although illustrative embodiments have been shown and described, a wide range of modification, change and substitution is contemplated in the foregoing disclosure and in some instances, some features of an embodiment may be employed without a corresponding use of other features. Accordingly, it is appropriate that the appended claims be construed broadly and in manner consistent with the scope of the embodiments disclosed herein.

What is claimed is:

1. A system comprising:
   a plurality of information handling systems situated in a common location;
   a concentrator coupled to the plurality of information handling systems by a respective I/O bus between each information handling system and the concentrator and by a respective sideband channel between each information handling system and the concentrator; and
   a remote terminal coupled to the concentrator, the remote terminal including a display;
   wherein the concentrator reports to a particular information handling system that the remote terminal has instructed the concentrator to connect the remote terminal to the particular information handling system, and in response the particular information handling system sends a display refresh to the concentrator for transmission to the remote terminal.

2. The system of claim 1 wherein each respective I/O bus is a serial bus.

3. The system of claim 1 wherein each respective sideband channel is a GPIO bus.

4. The system of claim 1 wherein the remote terminal is an information handling system.

5. The system of claim 1 wherein the common location is a rack.

6. A system comprising:
   a plurality of information handling systems situated in a common location; and
   a concentrator coupled to the plurality of information handling systems by a respective I/O bus between each information handling system and the concentrator and by a respective sideband channel between each information handling system and the concentrator, the concentrator including a port adapted for coupling to a remote terminal including a display,
   wherein the concentrator reports to a particular information handling system that the remote terminal has instructed the concentrator to connect the remote terminal to the particular information handling system, and in response the particular information handling system sends a display refresh to the port for transmission to the remote terminal.

7. The system of claim 6 wherein each respective I/O bus is a serial bus.

8. The system of claim 6 wherein each respective sideband channel is a GPIO bus.

9. The system of claim 6 wherein the remote terminal is an information handling system.

10. The system of claim 6 wherein the common location is a rack.

11. A method of communicating between a plurality of information handling systems and a remote terminal, the method comprising:
    coupling a plurality of information handling systems to a remote terminal via a concentrator therebetween;
    receiving, by the concentrator, a command from the remote terminal to connect the remote terminal to a particular information handling system;
    detecting, by the particular information handling system, when the particular information handling system becomes connected to the remote terminal; and
    sending, by the particular information handling system, a display refresh to the remote terminal when the particular information handling system detects that it has become connected to the remote terminal.

12. The method of claim 11 wherein the plurality of information handling systems is situated in a common location.

13. The method of claim 11 wherein the plurality of information handling systems is situated together in a rack.

14. The method of claim 11 further comprising communicating, by each information handling system, with the concentrator via a respective I/O bus therebetween.

15. The method of claim 11 further comprising receiving, by each information handling system, status information from the concentrator to enable each information handling system to determine when the concentrator is connecting that information handling system to the remote terminal.

16. A method of communicating between a plurality of blade servers and a remote terminal, the method comprising:
    coupling a plurality of blade servers to a remote terminal via a concentrator therebetween;
    receiving, by the concentrator, a command from the remote terminal to connect the remote terminal to a particular blade server;
    detecting, by the particular blade server, when the particular blade server becomes connected to the remote terminal by the concentrator; and
    sending, by the particular blade server, a display refresh to the remote terminal when the particular blade server detects that it has become connected to the remote terminal.

17. The method of claim 16 wherein the plurality of blade servers is situated in a common location.

18. The method of claim 16 wherein the plurality of blade servers is situated in a rack.

19. The method of claim 16 further comprising communicating, by each blade server, with the concentrator via a respective I/O bus therebetween.

20. The method of claim 16 further comprising receiving, by each blade server, status information from the concentrator to enable each blade server to determine when the concentrator is connecting that blade server to the remote terminal.

* * * * *